(12) United States Patent
Wahl et al.

(10) Patent No.: US 10,943,489 B2
(45) Date of Patent: Mar. 9, 2021

(54) METHOD FOR IMPROVING DRIVING SAFETY WHEN VEHICLES ARE TRAVELING IN CONVOY

(71) Applicant: Robert Bosch GmbH, Stuttgart (DE)

(72) Inventors: Anja Wahl, Markgroeningen (DE); Florian Mayer, Ditzingen (DE); Horst Jung, Fellbach (DE); Markus Henzler, Stuttgart (DE); Matthias Klews, Tübingen (DE); Uwe Wostradowski, Weil der Stadt-Merklingen (DE)

(73) Assignee: Robert Bosch GmbH, Stuttgart (DE)

( * ) Notice: Subject to any disclaimer, the term of this patent is extended or adjusted under 35 U.S.C. 154(b) by 309 days.

(21) Appl. No.: 16/149,559

(22) Filed: Oct. 2, 2018

(65) Prior Publication Data

US 2019/0122563 A1 Apr. 25, 2019

(30) Foreign Application Priority Data

Oct. 19, 2017 (DE) ...................... 10 2017 218 652.6

(51) Int. Cl.
*G08G 1/00* (2006.01)
*H04W 4/38* (2018.01)
*H04W 4/40* (2018.01)

(52) U.S. Cl.
CPC ................ *G08G 1/22* (2013.01); *H04W 4/38* (2018.02); *H04W 4/40* (2018.02)

(58) Field of Classification Search
None
See application file for complete search history.

(56) References Cited

U.S. PATENT DOCUMENTS

| | | | |
|---|---|---|---|
| 9,141,112 B1 * | 9/2015 | Loo | G08G 1/096866 |
| 9,817,404 B1 * | 11/2017 | Loo | H04W 4/08 |
| 10,394,253 B1 * | 8/2019 | Loo | H04W 4/46 |
| 2014/0309836 A1 * | 10/2014 | Ollis | G01C 21/00 701/25 |
| 2017/0039890 A1 * | 2/2017 | Truong | G07C 5/08 |
| 2017/0355377 A1 * | 12/2017 | Vijaya Kumar | B60W 50/0098 |
| 2018/0031405 A1 * | 2/2018 | Berentsen | B60K 15/03 |
| 2018/0050696 A1 * | 2/2018 | Misu | A61B 5/0077 |
| 2018/0141568 A1 * | 5/2018 | Singhal | B60W 10/18 |
| 2018/0307247 A1 * | 10/2018 | Taniguchi | G08G 1/22 |

FOREIGN PATENT DOCUMENTS

JP 2000311291 A * 11/2000 .......... G05D 1/0278

* cited by examiner

*Primary Examiner* — Shelley Chen
(74) *Attorney, Agent, or Firm* — Norton Rose Fulbright Us LLP; Gerard Messina

(57) ABSTRACT

A method for driving safety when vehicles are driving in convoy, in which a driver classification is performed during travel based on instantaneous sensor variables, and in which a recommendation for the vehicle order in the convoy is output.

11 Claims, 1 Drawing Sheet

METHOD FOR IMPROVING DRIVING SAFETY WHEN VEHICLES ARE TRAVELING IN CONVOY

RELATED APPLICATION INFORMATION

The present application claims priority to and the benefit of German patent application no. 10 2017 218 652.6, which was filed in Germany on Oct. 19, 2017, the disclosure which is incorporated herein by reference.

FIELD OF THE INVENTION

The present invention relates to a method for improving driving safety when vehicles, in particular motorized two-wheelers, are traveling in convoy.

BACKGROUND INFORMATION

When motorcycles are traveling in convoy there is often the problem that the riding abilities of the motorcyclists differ greatly, which may result in stress and dangerous situations especially in the case of weaker, inexperienced riders. Typically, weaker motorcyclists ride in the rear part of the convoy; there being the danger that they are left behind by the speedier riders riding ahead.

Another problem resides in the fact that after a longer period of riding signs of fatigue may have different effects on individuals, it being again weaker or inexperienced riders who are often more greatly affected, which increases the danger of being left behind further.

SUMMARY OF THE INVENTION

The method of the present invention is intended to improve driving safety when vehicles are traveling in convoy. The vehicles are in particular motorized two-wheelers such as motorcycles or motor scooters, trikes or quads being included as well. Furthermore, the vehicles also comprise passenger cars. An application in the case of bicycles or electric bikes is also possible. When vehicles are mentioned in the following, all of the aforementioned vehicles as well as other, which may be motorized, vehicles shall be included. It is possible for a convoy to include only vehicles one kind, for example only motorcycles, or it may include vehicles of various kinds such as both motorcycles as well as automobiles. The convoy is made up of at least two vehicles.

According to the method, a driver classification is performed during travel in one or multiple vehicles of the convoy on the basis of sensor variables ascertained in the vehicle. A recommendation for the order of the vehicles in the convoy is output on the basis of the driver classification.

The driver classification is performed for each vehicle individually and refers to the driver of the particular vehicle. Instantaneous sensor variables are obtained, which allow for an assessment and rating of the driving ability and driving behavior of the driver. This way of proceeding makes it possible, via the assessment of the driving ability, to perform a fundamental evaluation of the driver that is independent of a given situation. Moreover, via the assessment of the driving behavior, it is possible to take the current situation into account, for example fatigue of the driver, as a result of which the risk potential changes with the situation. Via the gathering of instantaneous sensor variables in the vehicle, it is thus possible to assess and to classify the driver comprehensively with respect to his driving ability and his driving behavior.

On the basis of the driver classification it is possible subsequently to output a recommendation for the order of the vehicles in the convoy. The recommendation concerns the position of the vehicle, whose driver is classified on the basis of instantaneous sensor variables, within the convoy. The recommendation may contain either a confirmation of the current position of the vehicle within the convoy or a change of the position of the vehicle within the convoy.

This way of proceeding represents a significant improvement of the driving safety of the members of the convoy. If three driver categories are distinguished for example, into which drivers are classified, for example a circumspect, experienced driver, an insecure or inexperienced driver and a speedy driver, who may move in the upper speed range, then for reasons of safety and practicability an order may be chosen having a circumspect driver at the head, an insecure or inexperienced driver in the middle and a speedy, fast driver at the end of the convoy. The driver classification, which is performed in at least one vehicle, in particular in multiple vehicles or in all vehicles of the convoy, allows for an assignment to one of these driver categories and accordingly a recommendation for the order of vehicles within the convoy.

The driver classification may be performed regularly while traveling. The driver classification accordingly occurs regularly on the basis of respectively instantaneous sensor variables, which are ascertained in the vehicle and which allow for a driver classification and an assignment of a driver category. The regular ongoing driver classification occurs either continuously or discontinuously at regular time intervals.

The sensor variables that are used as the basis of the driver classification concern in particular kinematic vehicle variables such as for example the longitudinal acceleration and—in the case of two-wheelers—the lean angle. The sensor variables stem for example from a sensor system for detecting driving state variables that is installed in the vehicle. Additionally and alternatively, it is also possible to use the sensor system of a smart phone carried by the driver, which is also able to detect kinematic driving state variables at the level of position, speed and/or acceleration, it being possible to consider both state variables of longitudinal dynamics as well as of lateral dynamics and possibly also of vertical dynamics. The same is true of a sensor system installed in the vehicle.

In addition or as an alternative to the aforementioned kinematic vehicle variables, the sensor variables at the basis of the driver classification may also be actuating variables that are produced directly by the driver for conducting the vehicle such as the braking pressure gradient, the choice of gear, the accelerator pedal position or the steering wheel angle. These variables may be detected via a sensor system built into the vehicle.

In addition or as an alternative to driving state variables, it is also possible to take into account sensorically detected surroundings variables, for example the current course of the road, the temperature, the weather, etc. Additionally or alternatively, it is also possible to take into account health-related driver variables, for example, blood pressure, heart frequency, eye movement, etc.

The recommendation for the order of vehicles is communicated at least to the relevant driver of the vehicle. For this purpose, the vehicle is equipped with a communication system, which allows for the visual or acoustic indication of information for the recommended vehicle order in the vehicle. According to an advantageous development, at least two vehicles, which may be all vehicles in the convoy are equipped with a communication system, which allows for an exchange of information between the vehicles; in this case the communication system in the vehicle, in addition to the indication of information, also comprises a transmitter unit as well as a receiver unit. Via the information exchange between the vehicles, it is, among other things, possible to determine the current order of the vehicles in the column. It is possible, for example, for vehicles to exchange positional data among themselves, it being possible to infer the vehicle order by comparing the positional data.

Ascertaining and recommending the vehicle order may occur automatically on the basis of the positional data of the vehicles as well as the instantaneous sensor variables.

Alternatively, it is also possible to enter the vehicle order manually into the driving safety system. For example, it is possible for a driver to enter his position within the convoy into the available driving safety system. The method for improving driving safety confirms the order on the basis of the current driver classification or outputs a recommendation for a modified order.

According to another expedient development, the recommendation for the vehicle order is transmitted to at least one additional vehicle of the convoy, which may be to all vehicles of the convoy. Accordingly, the information, to which position in the convoy the vehicle is to move, is available to at least one additional or to all other vehicles. Conversely, it is also expedient that a driver classification is performed in the at least one other vehicle, which may be in all other vehicles, likewise on the basis of sensor variables recorded there, and that a recommendation is generated, which is communicated both to the respective driver as well as advantageously to at least one additional or to all other drivers. For this purpose, it is expedient that a recommendation list is continually prepared, into which the information about the vehicle order of at least two vehicles, which may be of all vehicles, is entered. This makes it possible to void contradictory recommendations regarding the vehicle order. If, for example, the driver currently in the second position receives the recommendation to drop back by one position and at the same time the driver currently in the third position receives the recommendation to move up to the second position, it suffices to output an action recommendation either only to the third driver, to pass the driver ahead of him, or alternatively only to the second driver, to drop back by one position, in order to achieve the desired order by taking into account all of the recommendations.

The driving safety system, which is used for vehicles traveling in convoy and which serves to implement the method for improving driving safety that was described above, comprises at least in one vehicle that is part of the convoy, a sensor system, a processing unit and a communication system. Current information is gathered via the sensor system, especially about driving behavior, the processing unit processing the sensor variables and ascertaining a driver classification that is indicated in the communication system. Advantageously, at least two vehicle of the convoy, in particular all vehicles of the convoy, have a driving safety system of this kind. In a particular variant, the communication system may comprise a transmitting and receiving unit for communication with a corresponding communication system in another vehicle of the convoy, information being exchanged between the vehicles via the communication system.

The sensor system, the processing unit and the communication system may possibly all reside in a smart phone that is carried by the driver in the vehicle. Alternatively, it is also possible for at least a portion of the components or all components to be integrated into the vehicle. It is furthermore possible to integrate a portion of the components into the vehicle, for example the vehicle sensor system, and to use another portion of the components via the smart phone, for example the processing unit and the communication system for transmitting information between different vehicles.

The communication system may also comprise a headset in the vehicle, via which drivers are able to communicate verbally.

Additional advantages and expedient developments are found in the additional claims, in the description of the figures and the drawings.

DETAILED DESCRIPTION

Figure 1:
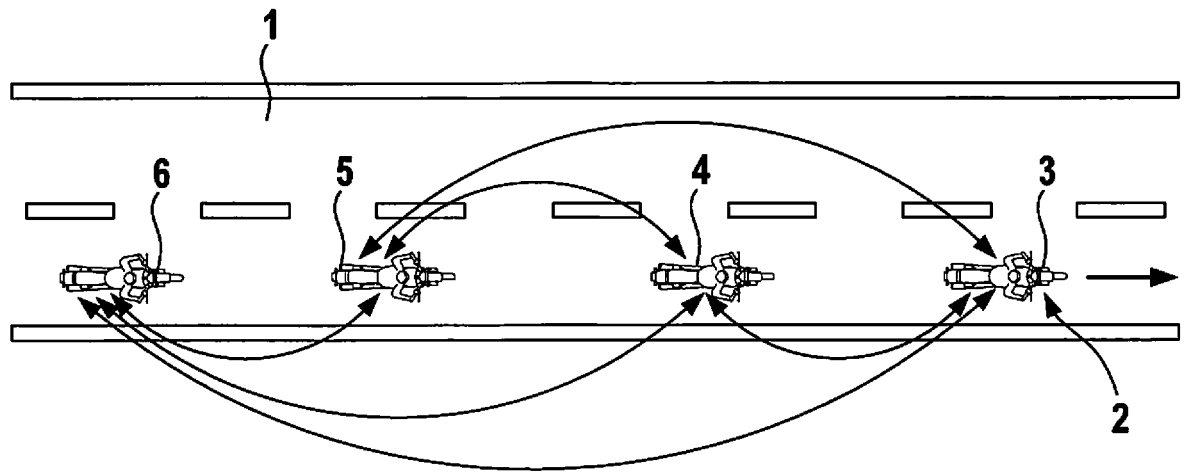
FIG. 1 shows a top view onto a vehicle convoy including altogether four motorcycles driving one after the other, which are equipped with a driving safety system for improving driving safety.

FIG. 1 shows a convoy 2 on a roadway 1, convoy 2 being made up of altogether four vehicles 3, 4, 5 and 6 driving straight ahead, which in this exemplary embodiment each take the form of a motorcycle. The convoy of the four motorcycles 3 through 6 forms a related vehicle group, whose vehicles are able to communicate among themselves, as indicated by the arrows. It is possible in this case to exchange information between all vehicles. The exchange of information occurs either directly between communication systems, which are installed in vehicles 3 through 6, or between devices carried along such as smart phones, for example, or via a system typical for the vehicle such as a headset that is carried along in the motorcycle helmets of the riders or is integrated into the helmets.

The communication system is a component of a driving safety system, which is used to implement a method for improving the driving safety. The driving safety system comprises a sensor system, a processing unit and the communication system described above for exchanging information between vehicles or drivers as well as for displaying or playing back information in a vehicle. All components of the driving safety system may be integrated in a smart phone or smart phones that are equipped with a corresponding software may be used for implementing the driving safety system.

Instantaneous sensor variables are ascertained on an ongoing basis via the sensor system, in particular kinematic vehicle variables such as for example the longitudinal acceleration and the lean angle of each motorcycle of convoy 2. A driver classification is performed on the basis of these sensor variables, in which the rider is assigned to one of several rider categories. It is possible to distinguish, for example, three different rider categories, namely, a circumspect, experienced rider, an insecure or inexperienced rider and a speedy rider, who typically travels at a speed that is above average.

For driving safety it is advantageous that the different riders, particularly when there is a great divergence in riding ability and riding behavior, occupy a specific order within the convoy. Thus it is expedient, for example, that vehicle 3 at the head of convoy 2 is driven by a circumspect and experienced rider. Vehicle 6 at the end of convoy 2 is to be driven by a speedy rider. Drivers who are rated as insecure and inexperienced are in the middle of the convoy on vehicles 4 and 5.

The driver classification and the sorting into the different driver categories occurs regularly while traveling by evaluating the sensor variables in each vehicle. Changes in the driving behavior, which occur during current travel for example due to fatigue, may result in a modified driver classification and assignment to a different driver category. This information is communicated acoustically and visually to the driver of the vehicle, it being further possible for the category change to be communicated to the other members of the convoy via the communication system equipped with a transmitting and receiving unit. The category change is accompanied by a recommendation for a change of the position in the convoy. It is possible to communicate this recommendation to the other members of the convoy as well. The driving safety system advantageously decides automatically which rider changes his position in order to achieve an order within the convoy that serves driving safety. This way of proceeding has the advantage that in the event of temporally coinciding or overlapping category changes of two or more riders in the convoy, the driving safety system is able to determine the position change of one or multiple vehicles within the convoy without contradiction and in an efficient manner.

Figure 2:
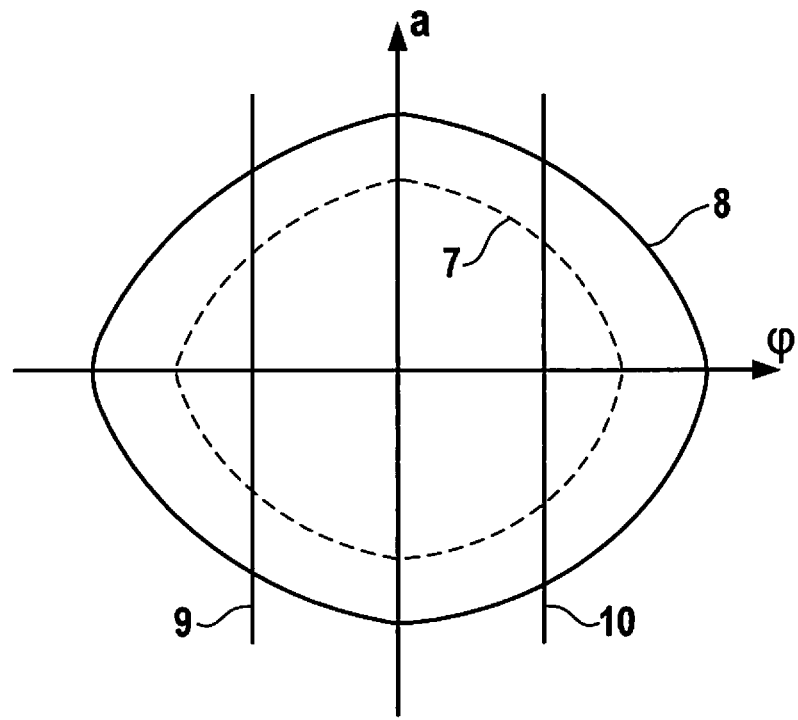
FIG. 2 shows a diagram showing the acceleration/deceleration curve as a function of the lean angle, with different positions for a circumspect rider, a speedy rider and an insecure rider.

FIG. 2 shows a diagram with the curve of the acceleration or deceleration a as a function of the lean angle cp. The area 7 indicated by a dashed line indicates the limits with respect to the acceleration and deceleration a and a positive and negative lean angle φ for left curves and right curves for a moderate, experienced driver. Area 8 delimited by a solid line, which is greater both with respect to the acceleration and deceleration, but also with respect to the lean angle, applies to a speedy rider. Furthermore, two straight lines 9 and 10 are drawn, which indicate a negative and a positive lean angle limit for an insecure or inexperienced rider, who normally moves within the lean angle range between limits 9 and 10. The insecure or inexperienced rider will also normally not exceed the acceleration and deceleration range delimited by the dashed line.

On the basis of the boundary lines 7, 8, 9 and 10 drawn in FIG. 2, it is possible to perform a driver classification or the check of the driver classification in the vehicle on an ongoing basis. For this purpose, using the sensor system in the vehicle, for example an inertial sensor system in a smart phone, the longitudinal acceleration or deceleration as well as the lean angle are ascertained and compared with the boundaries represented in FIG. 2. Accordingly, it is possible to rate the rider as belonging to one of the three categories of moderate rider, speedy rider and insecure rider. It is furthermore possible to determine changes during the ride, for example when a limit for the acceleration/deceleration or for the lean angle φ is repeatedly exceeded or undershot. The category change is possible in both directions, that is, both from the speedy rider to the moderate rider or from the moderate rider to the insecure rider as well as in the opposite direction. Accordingly, recommendation and strategies for a position change within the convoy may be output, which are advantageously made known to all riders.

What is claimed is:

1. A method for improving driving safety when vehicles are traveling in a convoy, the method comprising:
   performing, during travel, a driver classification in at least one of the vehicles of the convoy based on instantaneous sensor values; and
   outputting a recommendation based on the driver classification for an order of the vehicles in the convoy;
   wherein the sensor variables that are the basis of the driver classification include kinematic vehicle variables, which include at least a longitudinal acceleration and a lean angle, and
   wherein the instantaneous sensor values allow for an assessment and rating of a driving ability and a driving behavior of the driver, and by assessing the driving ability, performing an evaluation of the driver that is independent of a given situation.

2. The method of claim 1, wherein in each of the vehicles of the convoy, a driver classification is performed regularly based on the current sensor variables, and wherein a recommendation is output for the vehicle order in the convoy.

3. The method of claim 1, wherein the recommendation for the vehicle order ascertained in a vehicle is transmitted to at least one other vehicle of the convoy.

4. The method of claim 3, wherein the recommendation for the vehicle order ascertained in a vehicle is transmitted to all other vehicles of the convoy.

5. A driving safety system for vehicles traveling in a convoy, comprising:
   a sensor system;
   a processing unit for providing a driver classification, during travel, based on instantaneous sensor values; and
   a communication system in at least one of the vehicles for providing information about a recommended vehicle order in the vehicles of the convoy;
   wherein the sensor variables that are the basis of the driver classification include kinematic vehicle variables, which include at least a longitudinal acceleration and a lean angle, and
   wherein the instantaneous sensor values allow for an assessment and rating of a driving ability and a driving behavior of the driver, and by assessing the driving ability, performing an evaluation of the driver that is independent of a given situation.

6. The driving safety system of claim 5, wherein in at least two of the vehicles, a communication system for exchanging information and for indicating information is situated or carried along.

7. The driving safety system of claim 5, wherein the sensor system includes a smart phone sensor system of a smart phone carried in the vehicle.

8. The driving safety system of claim 5, wherein the processing unit includes a smart phone processing unit of a smart phone carried in the vehicle.

9. The driving safety system of claim 5, wherein the communication system includes a headset in the vehicle.

10. The driving safety system of claim 5, wherein at least one of the vehicles convoy includes a motorized two-wheeler.

11. The method of claim 1, wherein at least one of the vehicles convoy includes a motorized two-wheeler.

\* \* \* \* \*